H. R. KINNEY.
Harrow Teeth.
No. 107,506.
Patented Sept. 20, 1870.
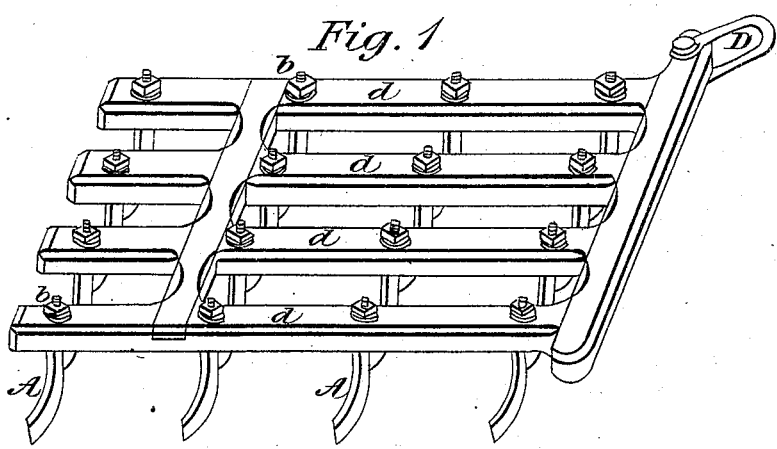
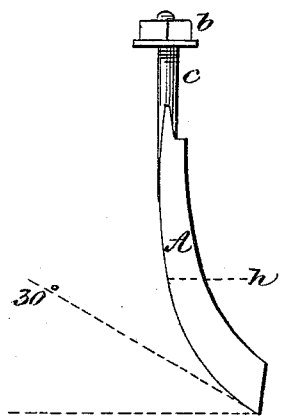
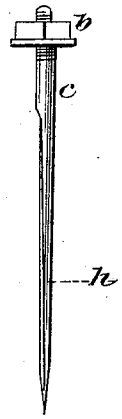
Witnesses:
Inventor:

United States Patent Office.

HENRY R. KINNEY, OF PORTSMOUTH, OHIO.

Letters Patent No. 107,506, dated September 20, 1870.

IMPROVEMENT IN HARROW-TEETH.

The Schedule referred to in these Letters Patent and making part of the same.

I, HENRY R. KINNEY, of Portsmouth, in the county of Scioto and State of Ohio, have invented an Improved Harrow-Tooth, of which the following is a specification.

Nature and Objects of the Invention.

My harrow-tooth is designed for penetrating the ground to cut the soil and buried stubble, and also for crushing the clods which lie upon the surface. For these purposes the end is cimeter-shaped, and the edge is not so far prolonged rearwardly, but that the point is directly employed in penetrating the ground. The upper anterior portion of the tooth is blunt, and is intended to crush the surface clods.

Description of the Accompanying Drawing.

Figure 1 is a perspective view of a harrow furnished with my improved tooth.
Figure 2 is a side elevation of a single tooth.
Figure 3 is a front elevation of a tooth.

General Description.

A is one of the teeth with which the harrow-frame of usual construction is filled.

Its upper portion $c$ fits into a mortise or bored hole in the bar $d$, and is secured by means of a nut, $b$.

D is the clevis, to which the open ring of the double-tree, or the hook of the spreader-chains, is attached.

The tooth, or, perhaps more properly, the colter A, is of a cimeter shape, more easily shown than described, and sufficiently exhibited in fig. 2. The edge has a backward curve, but it is not so prolonged that its tangent, at any point, shall have a less angle than, say, 30° with a base line. Were it prolonged beyond this limit, the edge would tend to ride upon, rather than draw against, the buried stubble, and the soil with which it came in contact. As will be seen by reference to fig. 3, the colter presents a positive point to penetrate the soil, and does not present its edge directly downward; it has the advantage of an obliquely-presented edge, giving what is termed a draw-cut, and the peneration is assisted by giving a sharp point to the lower termination of the tooth.

The edge terminates at a point, say, opposite to $h$, and the front part of the tooth, from this point upwardly, is broad, and calculated to bruise and crush the clods of the surface with which it may come in contact as it is dragged over the field.

Claim.

I claim as my invention—

The harrow-tooth, constructed as described and represented, having a backwardly-curved edge, a penetrating point, and a blunt vertical upper anterior portion, substantially as described and represented.

HENRY R. KINNEY.

Witnesses:
SOCRATES GLAZE,
R. LLOYD,
GEO. O. NEWMAN.